US009660921B2

(12) United States Patent
Changuel et al.

(10) Patent No.: US 9,660,921 B2
(45) Date of Patent: May 23, 2017

(54) ROBUST CONTENT-BASED SOLUTION FOR DYNAMICALLY OPTIMIZING MULTI-USER WIRELESS MULTIMEDIA TRANSMISSION

(71) Applicant: ALCATEL LUCENT, Paris (FR)

(72) Inventors: Nesrine Changuel, Colombes (FR); Bessem Sayadi, Colombes (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/649,833

(22) PCT Filed: Dec. 20, 2013

(86) PCT No.: PCT/EP2013/077558
§ 371 (c)(1),
(2) Date: Jun. 4, 2015

(87) PCT Pub. No.: WO2014/096298
PCT Pub. Date: Jun. 26, 2014

(65) Prior Publication Data
US 2015/0334028 A1    Nov. 19, 2015

(30) Foreign Application Priority Data

Dec. 21, 2012   (EP) ..................... 12306665

(51) Int. Cl.
*H04L 12/853* (2013.01)
*H04L 12/823* (2013.01)
(Continued)

(52) U.S. Cl.
CPC .......... *H04L 47/2416* (2013.01); *H04L 47/32* (2013.01); *H04L 65/4084* (2013.01);
(Continued)

(58) Field of Classification Search
CPC . H04L 47/2416; H04L 47/32; H04L 65/4084; H04L 65/80
(Continued)

(56) References Cited

U.S. PATENT DOCUMENTS

2010/0318675 A1*  12/2010  Nassor ............... H04L 47/10
709/235

FOREIGN PATENT DOCUMENTS

CN       102170425 A      8/2011

OTHER PUBLICATIONS

N. Changuel, "Online learning for QoE-based video streaming to mobile receivers", 2012 IEEE GLOBECOM WORKSHOPS, Dec. 7, 2012 (Dec. 7, 2012), 6 pages.
(Continued)

*Primary Examiner* — Ronald B Abelson
(74) *Attorney, Agent, or Firm* — Harness, Dickey & Pierce, P.L.C.

(57) ABSTRACT

A method for congestion control in a communications network supporting a plurality of streaming video traffics, said method comprising
a learning step to associate appropriate congestion control policies, respectively, with estimated video categories from a plurality of training streaming video traffics;
an estimating step of the video category of an ongoing streaming video traffic;
an application step of the congestion control policy associated with the estimated video category of the ongoing streaming video traffic to the said ongoing streaming video traffic.

9 Claims, 1 Drawing Sheet

(51) Int. Cl.
    *H04L 29/06*          (2006.01)
    *H04N 21/647*       (2011.01)
    *H04L 12/811*        (2013.01)

(52) U.S. Cl.
    CPC ........... *H04L 65/80* (2013.01); *H04N 21/647* (2013.01); *H04L 47/38* (2013.01)

(58) Field of Classification Search
    USPC ........................................................ 370/230
    See application file for complete search history.

(56) References Cited

OTHER PUBLICATIONS

F. Fu, "Structural solutions to dynamic scheduling for multimedia transmission in unknown wireless environments", Aug. 25, 2010 (Aug. 25, 2010), 14 pages.

International Search Report PCT/ISA/210 for International Application No. PCT/EP2013/077558 dated Apr. 22, 2014. (Use date of ISR).

\* cited by examiner

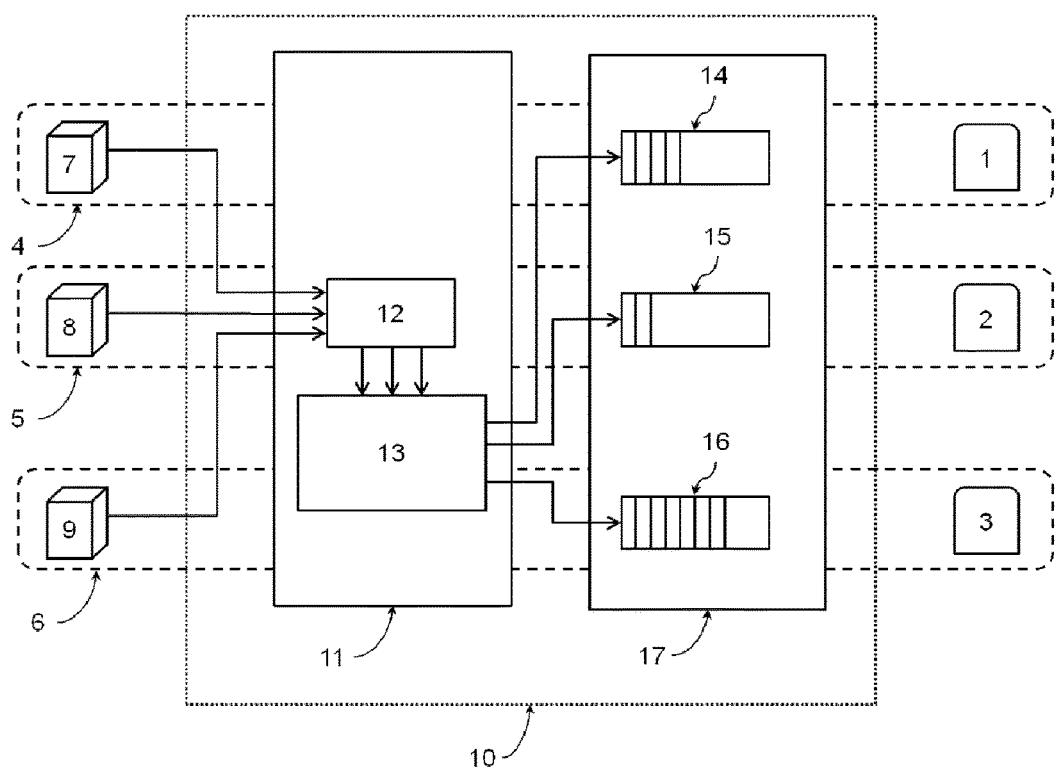

ROBUST CONTENT-BASED SOLUTION FOR DYNAMICALLY OPTIMIZING MULTI-USER WIRELESS MULTIMEDIA TRANSMISSION

FIELD OF THE INVENTION

The present invention relates to the optimization of multimedia content transmission over communications networks.

BACKGROUND OF THE INVENTION

With the exponential growth of multimedia traffics over wired and wireless networks due to the proliferation of multimedia-capable user equipments, monitoring multimedia traffics over communications networks is undoubtedly the most influential solution for congestion avoidance and achieving a tradeoff between the quality of service and the utilization of the network resources.

In fact, by causing queuing delay, packet loss and new connections blocking, network congestion severely impacts the perceived quality of service by users.

The recent networked applications, notably social networks and online content-sharing platforms, make things even more complicated as they bring massive amounts of multimedia traffic data to be processed in real-time. Hence, the volume of video traffic over communication networks is likely to intensify further and, even if rates provided mobile networks are increasing, the demand for high-quality contents is increasing faster.

Yet another problem of the prior art is that multimedia sessions between a client and a server are controlled only either by the client (as it is the case for HTTP adaptive streaming) or by the server (as it is the case for RTP). Hence, in both cases, the network is not aware of the video traffic and the control of any congestion in the network is left to the good behavior of ongoing multimedia sessions.

Furthermore, even if known algorithms for per traffic flow control are used at the level of the network, they become powerless as soon as a huge number of flows in the network should be simultaneously managed. The control system becomes very complex to solve. Indeed, avoiding congestion by simultaneously executing N times the same algorithm to handle N video flows at the same time is of unmanageable computational complexity.

Accordingly, more than one challenge is simultaneously facing congestion control over networks.

One object of the present invention is to propose an efficient method for multimedia content delivery so that ensuring for end-users the best quality of experience while taking into account the scarce network resources.

Another object of the present invention is to propose a scalable and tractable method for avoiding congestion in networks that are able to support a large number of multimedia flows.

Another object of the present invention is to optimize the delivery of multi-constrained traffics (delay, bandwidth, wireless access, and jitter) while taking into account most of the system constraints.

Another object of the present invention is to design network-level mechanisms for congestion control and video traffic delivery optimization.

Another object of the present invention is to improve the performance and reduce the computational complexity of congestion control mechanisms in TCP for best-effort services on wireless networks.

Another object of the present invention is to propose a method for efficiently streaming various multimedia contents to mobile receivers.

SUMMARY OF THE INVENTION

Various embodiments are directed to addressing the effects of one or more of the problems set forth above. The following presents a simplified summary of embodiments in order to provide a basic understanding of some aspects of the various embodiments. This summary is not an exhaustive overview of these various embodiments. It is not intended to identify key of critical elements or to delineate the scope of these various embodiments. Its sole purpose is to present some concepts in a simplified form as a prelude to the more detailed description that is discussed later.

Various embodiments relate to methods for congestion control in a communications network supporting a plurality of streaming video traffics, said method comprising—the step of determining an appropriate congestion control policy for an ongoing streaming video;

and wherein, for determining a plurality of appropriate congestion control policies respectively for a plurality of ongoing streaming video traffics, at the same time, comprises:

a learning step to predetermine a plurality of congestion control policies from a plurality of training streaming video traffics, a set of parameters being observed in corpus of representative video contents and learned using reinforcement learning, so that optimal policies are predetermined on the basis of the values at convergence of the considered parameters;

an estimating step to select, among the predetermined congestion control policies, a policy for each traffic of said plurality of ongoing streaming video traffics;

an application step to respectively apply the selected congestion control policies to the traffics of said plurality of ongoing streaming video traffics, at a same time.

In accordance with a broad aspect, the above methods further comprise an interception step in the communications network of a plurality of streaming video traffics.

In accordance with another broad aspect, the video category is estimated on the basis of parameters including the Radio Link Control buffer fullness, the encoding rate, the spatial resolution, the temporal resolution.

In accordance with another broad aspect, the congestion control policies include a video packet dropping policy and a transcoding policy.

Various embodiments relate to systems for congestion control in a communications network supporting a plurality of streaming video traffics, said systems comprising
  a filtering decision module learned to associate appropriate congestion control policies, respectively, with estimated video categories from a plurality of training streaming video traffics;
  a video classifier configured to estimate the video category of an ongoing streaming video traffic;
  means for applying the congestion control policy associated with the estimated video category of the ongoing streaming video traffic to the said ongoing streaming video traffic.

Various embodiments further relate to a core network node comprising the above systems.

In accordance with a broad aspect, the above core network node is configured to intercept a plurality of streaming video traffics supported by a communications network.

Various embodiments further relate to a computer program product for performing the above methods.

While the various embodiments are susceptible to various modification and alternative forms, specific embodiments thereof have been shown by way of example in the drawings. It should be understood, however, that the description herein of specific embodiments is not intended to limit the various embodiments to the particular forms disclosed.

It may of course be appreciated that in the development of any such actual embodiments, implementation-specific decisions should be made to achieve the developer's specific goal, such as compliance with system-related and business-related constraints. It will be appreciated that such a development effort might be time consuming but may nevertheless be a routine understanding for those or ordinary skill in the art having the benefit of this disclosure.

BRIEF DESCRIPTION OF THE DRAWINGS

The objects, advantages and other features of the present invention will become more apparent from the following disclosure and claims. The following non-restrictive description of preferred embodiments is given for the purpose of exemplification only with reference to the accompanying drawing in which FIG. 1 is a schematic diagram illustrating an environment for deploying various embodiments.

DETAILED DESCRIPTION OF ILLUSTRATIVE EMBODIMENTS

With reference to FIG. 1, there is shown a plurality of user equipments 1-3 connected to a communication network 10 and involved, respectively, in unicast streaming sessions 4-6.

The streaming contents are streamed to the user equipments 1-3 from different content provider sources 7-9. These remote content provider sources 7-9 may belong to different service platforms (such as, Video on Demand, IPTV, time-shifted TV, IPTV, social network, video-sharing platform). The content provider sources 7-9 may be a video server, a web server, an overlay node distributing a live video program, or more generally any network node able to stream a content through the network 10 to downstream user equipments 1-3.

By "user equipment" is meant here any user device capable of establishing a unicast streaming session with a remote content provider source. A desktop computer, a laptop computer, a notebook, a tablet, a smartphone, a mobile telephone, or a Personal Digital Assistant (PDA) are examples of such user equipments 1-3.

The congestion inside the network 10 because of the simultaneous multiple ongoing unicast streaming sessions 4-6 is avoided thanks to the application of a video classifier 12 and a trained filtering decision module 13.

The video classifier 12 is configured to estimate the video category of a streaming video traffic. The filtering decision module 13 is trained (learning phase) online or offline to determine optimal congestion control policies to be applied to each estimated video category for congestion avoidance in the network 10.

The optimal policies to be applied to a given streaming video traffic for congestion avoidance (such as filtering, selecting, or dropping strategy of video packets) are associated with the estimated category of this video and are inferred from the values of the considered parameters for its categorization. As examples of such parameters, one can mention the RLC (Radio Link Control) buffer 14-16 fullness in the base station 17, the priority level of the transmitted frame, the playback margin of the user, the encoding rate, the activity level, the spatial resolution, the temporal resolution, or on any other distinctive feature among video contents.

In fact, during a learning phase, a set of parameters are observed in corpus of representative video contents and learned using reinforcement learning, so that different categories of video and corresponding optimal policies are obtained on the basis of the values at convergence of the considered parameters. The control problem is cast in the framework of Markov Decision Processes.

The corpus of representative video contents may include usual or intentionally modified video sequences so that covering video content (such as news, movie, sports, documentary) with different features (for example, temporal resolution, spatial resolution, distortion, encoding rate, constraint).

The learning phase permits to obtain a Q-matrix, or more generally a set of data, which defines the optimal scheduling action(s) to take for streaming video traffic. Each matrix is then labeled and stored according to the category of the learned streaming video traffic.

Once matrices with optimal actions relating to a given video category are learned, these matrices are used online by the filtering decision module 13 for any other ongoing streaming video traffic falling in this same category. In other words, when an ongoing streaming video traffic belongs to the same category of a previously learned video content, the Q-matrix of the previously learned video is used by the filtering decision module 13 to schedule the ongoing streaming video traffic.

Accordingly, a learning/training phase is performed offline to categorize various video flows and obtain a sort of mask or a set of policies learned to be applied to online streaming video traffic 4-6. Thus, obtained optimal policies during the learning phase are used online while streaming the video traffics based on their estimated categories.

In one embodiment, to make sure that an optimal congestion control policy learned for a given video is also optimal for another sequence within the same category, a decision making algorithm (i.e. the filtering decision module 13) is learned on a first video V1 and tested with obtained optimal congestion control policies for a second video V2 considered of the same category C1. Then, the filtering decision module 13 is trained (learning phase) on a third video V3 of category C3 and tested with obtained optimal congestion control policies for the second video V2.

In one embodiment, the category granularity of video contents may be further fine-tuned, namely at a frame level (i.e. per frame), at a Group of Picture (GoP) level (i.e. per GoP), at a set of GoPs level (medium level), or at video clip level (coarse level, i.e. the whole video content).

The set of actions (i.e. congestion control policies) pre-computed\learned by the filtering decision module 13 and associated with a given video category are applied to any ongoing streaming video traffic falling in this same category at a core network node 11 to solve the congestion inside the network 10.

The traffic of the ongoing streaming sessions 4-6 are intercepted by the core network node 11 (for example, a proxy) and provided to the video classifier 12.

The video classifier 12 is in charge of estimating the category to which an ongoing streaming video traffic does belong.

Alternatively, the category of each unicasted video stream may be defined by the content provider sources 7-9 and marked in the flow at the beginning of the transmission.

The filtering decision module 13 in the core network node 11 is in charge of selecting the appropriate congestion control policies to be applied to each ongoing streaming video traffic in function of its video category which is estimated by the video classifier 12.

Moreover, the filtering decision module 13 maximizes the quality of the received video while accounting for the variations of the characteristics of the streaming video traffic and of the channel at each unicast streaming sessions 4-6.

For that purpose, the quality of the decoded frames at the user equipment 1-3 is inferred by an observation of the quality of the various scalability layers and of the level of queues at the RLC/MAC layer of the content provider sources 7-9 only. The learning phase is in charge of finding the optimal filtering action to take in each of the possible system state. The optimal action should lead to a maximum received quality.

For example, the filtering decision module 13 selects the number of video packet to transmit (or to selectively drop) for each video program based on a set of parameters (such as buffer fullness of each link) corresponding to a certain video category, so that the received video quality is maximized.

Furthermore, the action that the filtering decision module 13 may take can be a transcoding action in case of a video source encoded with H263, H264/AVC or MPEG2/4 standard or a layer filtering mechanism in case of H264 SVC (Scalable Video Coding). This operation is needed in order to maximize the received quality. The video quality may be measured using any of the existing subjective or objective metrics.

Accordingly, the delivery of a video program from the content provider sources 7 to the user equipment 1 through the unicast streaming session 4 may be achieved as follow
- sending frame packet from video program i, the frame type is fi
- measuring the considered parameters, such us the buffer fullness of the RLC 14 buffer Bi of program i;
- estimating the category Ci of program i, Ci depending on the content of the video;
- applying the optimal filtering decision, selected by the filtering decision module 13, which maximize the received quality based on Bi, fi and Ci.

Advantageously, thanks to the above described method and system, the computational complexity and the computational time of selecting/dropping strategies are significantly reduced, allowing to simultaneously handle multiple video flows for congestion avoidance. In particular, seeing that the reinforcement learning phase which is the most time consuming phase is done offline, the online computational time is reduced and the delivery decision time become rapid. Moreover, an expressive amount of CPU time and memory requirement may be gained at the level of the network node resources.

Advantageously, the above described method for video content delivery allows at the same time the control of the video flow, its classification and the control of the network congestion using RLC buffer 14-16 status in the base station 17 for a plurality of unicast connections in parallel (and not individually).

Advantageously, the congestion control is made at a core network node for all the active streaming video traffic and not at each stream path in the network.

The invention claimed is:

1. A method for congestion control in a communications network supporting a plurality of streaming video traffics, said method comprising:
   determining, offline, a plurality of congestion control policies based on a plurality of training streaming video traffics and values of a set of parameters associated with the plurality of training streaming video traffics at convergence of the set of parameters, the set of parameters being observed in corpus of representative video contents of the plurality of training streaming video traffics, the set of parameters learned using reinforcement learning, the set of parameters including Radio Link Control buffer fullness, encoding rate, spatial resolution, and temporal resolution;
   selecting, online, among the determined plurality of congestion control policies, a congestion control policy for each traffic of a plurality of ongoing streaming video traffics, based on values of the set of parameters associated with each traffic, respectively; and
   applying, online, the selected congestion control policies to the traffics of the plurality of ongoing streaming video traffics, respectively.

2. The method of claim 1, further comprising;
   intercepting, in the communications network, the plurality of streaming video traffics.

3. The method of claim 1, wherein the selecting the congestion control policy for each traffic of the plurality of ongoing streaming video traffics is performed per frame.

4. The method of claim 1, wherein the selecting the congestion control policy for each traffic of the plurality of ongoing streaming video traffics is performed per group of picture.

5. The method of claim 1, wherein the congestion control policy is a video packet dropping policy.

6. The method of claim 1, wherein the congestion control policy is a transcoding policy.

7. A system for congestion control in a communications network supporting a plurality of streaming video traffics, the system comprising:
   a memory storing a program of instructions; and
   a processor configured to execute the program of instructions to
      determine, offline, a plurality of congestion control policies based on a plurality of training streaming video traffics and values of a set of parameters associated with the plurality of training streaming video traffics at convergence of the set of parameters, the set of parameters being observed in corpus of representative video contents of the plurality of training streaming video traffics, the set of parameters learned using reinforcement learning, the set of parameters including Radio Link Control buffer fullness, encoding rate, spatial resolution, and temporal resolution,
      select, online, among the determined plurality of congestion control policies, a congestion control policy for each traffic of a plurality of ongoing streaming video traffics, based on values of the set of parameters associated with each traffic, respectively, and
      apply, online, the selected congestion control policies to the traffics of the plurality of ongoing streaming video traffics, respectively.

8. The core network node of claim 7, wherein the processor is further configured to execute the stored instructions to intercept a plurality of streaming video traffics supported by a communications network.

9. A non-transitory computer-readable storage medium storing a computer program executable by a processor of a computer, to cause the processor to perform the method of claim 1.

\* \* \* \* \*